July 10, 1934.   W. A. RIDDELL   1,966,313
PHOTOGRAPHIC CAMERA SHUTTER RETARD
Filed Oct. 21, 1933
Fig.1.
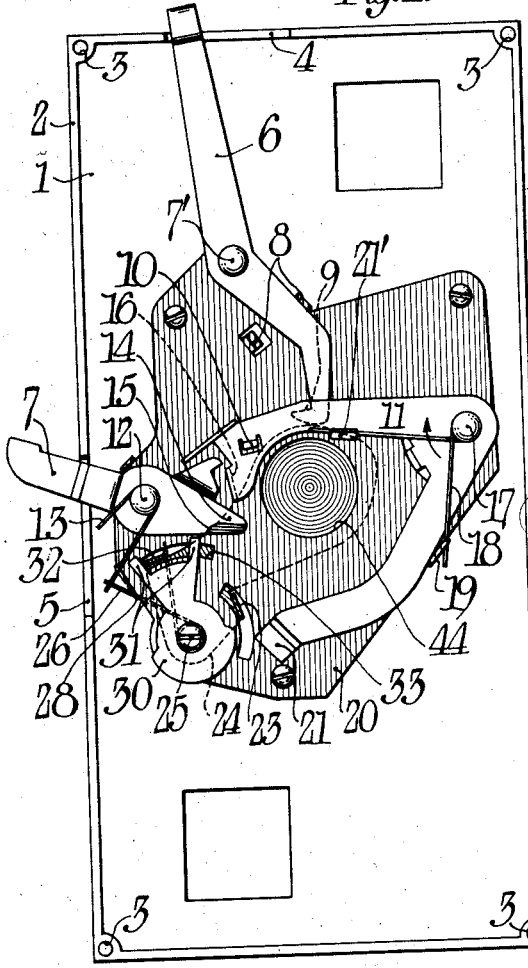
Fig.2.
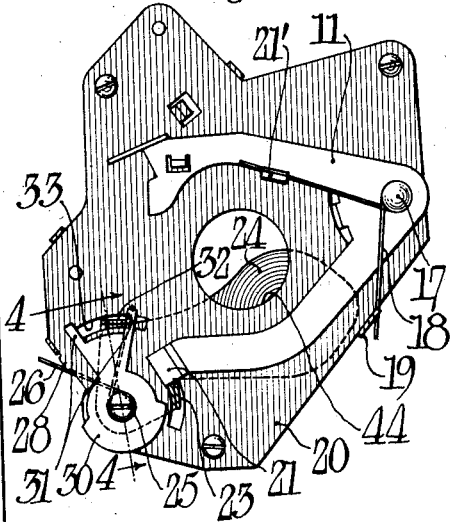
Fig.3.
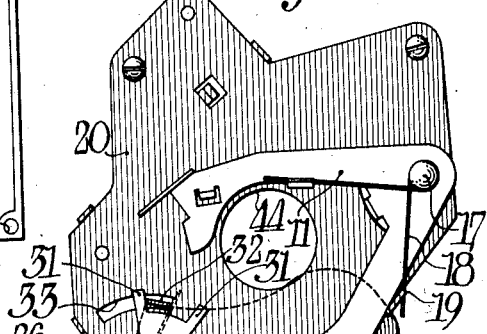
Fig.4.
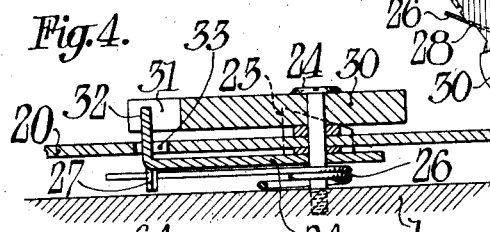
Fig.5.
Inventor:
William A. Riddell,
Attorneys Patented July 10, 1934

1,966,313

UNITED STATES PATENT OFFICE 1,966,313

PHOTOGRAPHIC CAMERA SHUTTER RETARD

William A. Riddell, Rochester, N. Y., assignor to Eastman Kodak Company, Rochester, N. Y., a corporation of New York Application October 21, 1933, Serial No. 694,587

10 Claims. (Cl. 95—59)

This invention relates to photography and more particularly to camera shutters. One object of my invention is to provide a camera shutter which makes an automatic exposure of proper duration for the so-called instantaneous exposures. Another object of my invention is to provide a shutter retarding device operatively connected with the shutter leaf. Another object of my invention is to provide a balanced weight which will serve to retard the shutter actuating mechanism. Another object of my invention is to provide a weight balanced upon a pivot for a retarding device, the weight being so distributed that this member will normally lie in any set position. Still another object of my invention is to provide a simple type of shutter which can be readily assembled and in which the exposure can be accurately controlled during the assembling operation and other objects will appear from the following specification, the novel features being particularly pointed out in the claims at the end thereof.

My invention is particularly directed towards controlling the duration of the exposure of a simple type of shutter such as shown in Patent No. 1,925,567, W. A. Riddell, for Photographic shutters, issued September 5, 1933.

In shutters of a simple type in which only "instantaneous" exposure can be made it is necessary to have this exposure of sufficient duration to fully expose the normal types of film and yet the exposure must not be too long because it is difficult to hold a camera still when exposures are made in the hand. It has been found that the best exposure for most purposes with shutters of this kind is approximately a twenty-fifth of a second.

It is very difficult to maintain an exposure of definite duration with a simple shutter particularly of the type wherein a single shutter leaf is moved back and forth to uncover an exposure aperture. The speed of such shutters normally depends on the strength of the springs which drive the parts of the shutter particularly the strength of the spring which drives the master member which opens the shutter blade and the strength of the spring which drives the shutter leaf which closes the exposure aperture.

In accordance with my provision I provide a balanced weight for retarding the exposure and by altering the weight of this balanced weight different exposures can be obtained with the same springs in a shutter or similar exposures can be obtained with different springs.

Coming now to the drawing wherein like reference characters denote like parts throughout:

Fig. 1 is a plan view of a shutter with the top of the casing removed showing shutter mechanism constructed in accordance with and embodying a preferred form of my invention;

Fig. 2 is a plan view of parts of the shutter mechanism moved to make the exposure, the shutter blade being shown in a partially open position;

Fig. 3 is a view similar to Fig. 2 but with the shutter blade in a completely opened position;

Fig. 4 is a fragmentary section on line 4—4 of Fig. 2; and

Fig. 5 illustrates the weight construction in accordance with a second embodiment of my invention.

While the main part of the shutter structure illustrated in the drawing is exactly the same as that shown in my above mentioned patent, I will briefly describe the operation of this shutter mechanism to which my present retard is added.

The shutter may consist of a casing 1 which is provided with flanged side walls 2 having tapped openings 3 for receiving a cover plate which may be attached by screws passing into the tapped openings in a well known manner.

The flanged side walls 2 are provided with slots 4 and 5 through which the time exposure lever 6 and the trigger 7 may pass so as to be accessible to an operator from the outside of the shutter casing.

The time exposure lever 6 is pivoted upon a stud 7' and is movable between a pair of spaced stops 8 so that the position of the hook 9 can be regulated with regard to a lug 10 bent down from the master member 11.

The trigger 7 is pivoted upon a stud 12 and is normally held by a spring 13 in the position shown in Fig. 1, that is, in a position for making instantaneous exposures. The trigger 7 is provided with a toe 14 adapted to move the master member 11 in one direction, trigger 7 having a beveled edge 15 adapted to ride under the downwardly formed end 16 of the master member 11, in moving in an opposite direction, thus not turning it upon its pivot 17. A spring 18 engaging a lug 19 on the base plate 20 and engaging lug 21' on the master member normally holds the master member against the lug 19 in a position in which the end 21 of the master member is inoperative.

When the trigger is depressed member 14 rides up engaging lug 16 and by engaging the lug swings the master member in the direction shown by the arrow in Fig. 1 upon its pivot 17 causing the end 21 to ride up over the lug 23 which is a part of the shutter leaf 24.

The shutter leaf is pivoted upon a stud or screw 25 and when engaged by the lug 21 it moves in a clockwise direction about pivot 25.

Fig. 2 illustrates the position of the parts as the shutter blade 24 is partially opened by the master member 11 and Fig. 3 illustrates the shutter blade 24 as being fully opened just after the end 21 of the master member has slipped off of the lug 23 carried by the shutter blade. The shutter blade 24 will now return to its initial position under the impulse of its own spring 26, this spring engaging the lug 32. Extending downwardly toward the shutter blade is a fixed lug 28 on the base plate 20.

As above explained it is difficult to control the speed with which the springs 18 and 26 will permit an exposure to be made. Consequently, in order to obtain exactly uniform speeds of the desired duration, I have provided a balanced weight 30 which co-operates with the mechanism to produce even exposures.

The weight 30 may be carried by a screw 25, which as above explained, forms the pivot of the shutter member 24.

The shape of this weight is such that the weight is perfectly evenly distributed about the pivot 25 and consequently it will remain in any fixed or set position until moved. I prefer to provide a pair of spaced arms 31 on this weight which in effect form a yoke. These arms are spaced apart a distance greater than the width of the lug 32 which is formed on the shutter member and which extends upwardly through an arcuate slot 33. Thus when the blade begins to move from the position shown in Fig. 1 the weight 30 remains idle until the lug 32 on the shutter blade engages one of the arms 31 of the weight.

As indicated in Fig. 2 the arm 31 of the weight is first engaged when the shutter is about half opened. Thus the lug 32 strikes the arm 31, causing the weight 30 to swing upon its pivot 25 and since the blow so struck is a sharp one the weight tends to turn more rapidly about its pivot than does the shutter blade 24. Consequently, when the shutter blade is fully opened, as is shown in Fig. 3, the other arm 31 of the weight 30 swings over and strikes the lug 32 and retards the return movement of the shutter 24 under the impulse of its spring 26. However, the spring 26 overcomes the inertia of the weight 30 and returns the weight to its initial position as shown in Fig. 1 as the shutter blade 24 returns to close the exposure opening 44.

It is a comparatively simple matter to provide a series of these weights of different weights for use in assembling shutters of this type. If the springs 18 and 26 should be found to give too fast an exposure a heavier weight 30 may be selected and assembled into the shutter. If, on the other hand, the exposures obtained should be too long, a lighter weight can be selected.

There are numerous shutter testing devices which can be used to indicate the duration of a test exposure and ordinarily with springs made from the same spring wire it is not necessary to try out different weights for the same set of springs. However, where different wire is used the springiness may vary and in such cases properly selected weights will correct for inaccuracies of exposures which would otherwise result.

It is obvious that the form or shape of the weight is immaterial if the weight is properly balanced. By balanced I mean a weight having the weight so distributed about the pivotal point of the weight that it will remain in a set position regardless of the position of the camera on which it is used.

In Fig. 5 I have shown another embodiment of my invention in which the weight 60 is pivoted upon a stud 61 which also forms the pivot for the shutter leaf 62. In this case the weight is provided with a slot 63 in which a pin 64 projects, this pin extending upwardly from the shutter leaf 62. Thus as is the case in the first mentioned embodiment of my invention the shutter leaf 62 is free to move and the pin 64 is free to swing through the slot 63 without moving the weight until pin 64 strikes an end 65 of the slot.

The lost motion between the balanced weight and the shutter blade is important because it permits the weight to give more of a retarding action than where the weight is directly connected to a movable part.

I am aware that weights have been used in connection with shutters to retard their action, these weights being usually connected either to the master member or to some part of the shutter which is actuated by the master member.

However, I believe that there are advantages which are very material which result from connecting the weight directly with the shutter leaf. This is particularly true with a simple type of shutter such as shown in the drawing because not only will the weight retard the latter part of the opening movement of the shutter blade 24 but it will also retard the closing movement of this member. The only way that the weight can retard the closing movement of a shutter of this type is to act directly on the shutter blade because after the master member operating end 21 slips off the shutter blade lug 23, the shutter blade returns to its normal position under the power of its own spring. When the retard is connected directly to the shutter blade as in accordance with my invention, this return movement of the shutter blade is also retarded by the weight. However, in the return movement of the shutter blade the arm 31 of the weight is moved by the lug 32 of the shutter blade and the retarding action is not so great as the retarding action during the opening movement in which the arm 31 strikes the shutter blade lug 32 a distinct blow when the blade is in a fully opened position as described above.

Having thus described my invention, what I claim as new and desire to be secured by Letters Patent of the United States is:

1. In a photographic shutter, the combination with shutter mechanism, of a shutter leaf adapted to be operated by the shutter mechanism, a trigger for operating the mechanism, and means for controlling the duration of an exposure comprising a weight, said weight being positioned to directly engage the shutter leaf.

2. In a photographic shutter, the combination with shutter mechanism, of a shutter leaf adapted to be operated by the shutter mechanism, a trigger for operating the mechanism, and means for controlling the duration of an exposure comprising a weight, the weight having spaced arms, a lug on the shutter leaf projecting between the spaced arms whereby movement of the shutter may cause the weight to move in one direction and the other arm may strike said shutter leaf lug and thus retard the movement of the shutter leaf from a fully opened position.

3. In a shutter for photographic cameras the combination with a shutter casing of mechanism carried by the casing including a shutter blade, a master member for operating said blade, and a trigger for operating said master member, means for retarding the shutter blade movement including a pivoted balanced weight, said blade and weight including parts adapted to engage.

4. In a shutter for photographic cameras the combination with a shutter casing of mechanism carried by the casing including a shutter blade, a master member for operating said blade, and a trigger for operating said master member, means for retarding the shutter blade movement including a pivoted balanced weight, and a single stud supporting the shutter leaf and balanced weight.

5. In a shutter for photographic cameras the combination with a shutter casing of mechanism carried by the casing including a shutter blade, a master member for operating said blade, and a trigger for operating said master member, means for retarding the shutter blade movement including a pivoted balanced weight, interengaging connections between the weight and shutter leaf, the sole means of moving said weight being through the interengaging portions of the weight and shutter leaf.

6. In a shutter for photographic cameras the combination with a shutter casing of mechanism carried by the casing including a shutter blade, a master member for operating said blade, and a trigger for operating said master member, means for retarding the shutter blade movement including a pivoted balanced weight, said blade and weight including parts adapted to engage said blade being adapted to hold said weight through said interengaging parts in a normal postiion of rest.

7. In a shutter for photographic cameras the combination with a shutter casing of mechanism carried by the casing including a shutter blade, a master member for operating said blade, and a trigger for operating said master member, means for retarding the shutter blade movement including a pivoted balanced weight, including spaced arms, a lug on the shutter blade projecting between the spaced arms and having a normal position in contact with one arm, said shutter blade lug, when actuated through the master member and trigger being adapted to swing idly from the normal position striking the other arm of said weight causing the weight to swing on its pivot whereby the first arm may strike said shutter blade lug retarding the movement thereof.

8. In a shutter for photographic cameras the combination with a shutter casing of mechanism carried by the casing including a shutter blade, a master member for operating said blade, and a trigger for operating said master member, means for retarding the shutter blade movement including a pivoted balanced weight, said weight and shutter blade being pivoted coaxially, parts on the weight and shutter blade adapted to co-operate and form a lost motion connection.

9. In a shutter for photographic cameras the combination with a shutter casing of mechanism carried by the casing including a shutter blade, a master member for operating said blade, and a trigger for operating said master member, means for retarding the shutter blade movement including a pivoted balanced weight, a spring adapted to hold the shutter blade in a closed position, said weight and shutter blade both including cooperating parts constituting a lost motion connection therebetween, said shutter spring holding the blade and the weight through the lost motion connection in a normal position of rest.

10. In a shutter for photographic cameras the combination with a shutter casing including an exposure opening, of mechanism carried by the casing including a shutter leaf movable between a normal position of rest in which light is excluded from the exposure opening, and an open position in which light is admitted through the exposure opening, a master member for operating the shutter leaf, a trigger for operating the master member, a retarding means for the shutter leaf comprising a pivoted balanced weight, a lost motion connection between said weight and said shutter leaf through which motion may be transmitted to the weight, the lost motion connection being positioned and arranged so that the shutter blade may be moved through the master member and trigger a distance before the weight is moved by the shutter leaf, whereby the shutter blade may be retarded only after it is moved toward an open position.

WILLIAM A. RIDDELL.